United States Patent
Idemura et al.

(10) Patent No.: US 9,150,744 B2
(45) Date of Patent: Oct. 6, 2015

(54) AQUEOUS PIGMENT LIQUID DISPERSION AND INK-JET RECORDING INK, AND PRODUCTION METHOD OF AQUEOUS PIGMENT LIQUID DISPERSION

(75) Inventors: Satoshi Idemura, Saitama (JP); Kenji Sugo, Kitaadachi-gun (JP); Hiroshi Katsube, Tokyo (JP); Masanori Fujimaki, Narita (JP)

(73) Assignee: DIC Corporation, Tokyo (JP)

( * ) Notice: Subject to any disclaimer, the term of this patent is extended or adjusted under 35 U.S.C. 154(b) by 1266 days.

(21) Appl. No.: 12/308,902

(22) PCT Filed: Jun. 26, 2007

(86) PCT No.: PCT/JP2007/062787
§ 371 (c)(1),
(2), (4) Date: Dec. 29, 2008

(87) PCT Pub. No.: WO2008/001762
PCT Pub. Date: Jan. 3, 2008

(65) Prior Publication Data
US 2009/0326127 A1 Dec. 31, 2009

(30) Foreign Application Priority Data

Jun. 30, 2006 (JP) ................................. 2006-181358
Oct. 31, 2006 (JP) ................................. 2006-295734

(51) Int. Cl.
| C08K 5/34 | (2006.01) |
| C09D 11/322 | (2014.01) |
| C09D 11/326 | (2014.01) |
| C09D 17/00 | (2006.01) |

(52) U.S. Cl.
CPC ............ *C09D 11/322* (2013.01); *C09D 11/326* (2013.01); *C09D 17/003* (2013.01)

(58) Field of Classification Search
CPC ........ C08K 5/34; C08K 5/3415; C09B 67/00; C09D 11/00; C09D 11/02; C09D 11/10; C09D 11/322; C09D 17/003; C09D 11/326
USPC .............................. 523/160, 161; 524/88, 556
See application file for complete search history.

(56) References Cited

U.S. PATENT DOCUMENTS

| 6,399,674 B1 | 6/2002 | Kashiwazaki et al. |
| 6,419,733 B1 * | 7/2002 | Sano et al. ................. 106/31.86 |
| 7,858,676 B2 * | 12/2010 | Waki et al. .................... 523/160 |
| 2008/0139706 A1 * | 6/2008 | Kaji et al. ........................ 524/88 |

FOREIGN PATENT DOCUMENTS

| EP | 0933406 A1 | 8/1999 | |
| EP | 1555549 A2 | 7/2005 | |
| JP | 2000-186244 | 7/2000 | |
| JP | 2000-303014 | 10/2000 | |
| JP | 2001-354886 | 12/2001 | |
| JP | 2002-088290 | 3/2002 | |
| JP | 2004-352932 | 12/2004 | |
| JP | 2005-048005 | 2/2005 | |
| JP | 2005-048006 | 2/2005 | |
| JP | 2005-060420 | 3/2005 | |
| JP | 2006-077201 | 3/2006 | |
| JP | 2006-152145 | 6/2006 | |
| JP | 2006-160950 | 6/2006 | |
| JP | 2006-233211 | 9/2006 | |
| WO | WO 2005014733 A1 * | 2/2005 | ............. C09D 11/00 |

OTHER PUBLICATIONS

Supplementary European Search Report dated Nov. 24, 2010, issued for the corresponding European patent application No. 07767593.2.
International Search Report mailed Jul. 31, 2007, issued on PCT/JP2007/062787.

* cited by examiner

*Primary Examiner* — Fred M Teskin
*Assistant Examiner* — Marie Reddick
(74) *Attorney, Agent, or Firm* — Locke Lord LLP; James E. Armstrong, IV; Nicholas J. DiCeglie, Jr.

(57) ABSTRACT

The present invention relates to an ink-jet recording ink which can simultaneously achieve long-term preservation stability, high luster, and light fastness of a printed image, and an aqueous pigment liquid dispersion to produce the ink. Moreover, the present invention relates to a production method of the aqueous pigment liquid dispersion. For the aforementioned objects, the applicant provides an aqueous pigment liquid dispersion, including: C. I. pigment green 36 (a); a styrene-acrylic acid type copolymer (b); a basic compound (c); and a wetting agent (d), wherein the styrene-acrylic acid type copolymer (b) has styrene-based monomer units of 60 mass % or more in the total of all the monomer units, an acid value of 120 to 240, and a weight average molecular weight of 6,000 to 40,000, and the mass ratio (b)/(a) is within a range from 0.15 to 0.25.

12 Claims, No Drawings

AQUEOUS PIGMENT LIQUID DISPERSION AND INK-JET RECORDING INK, AND PRODUCTION METHOD OF AQUEOUS PIGMENT LIQUID DISPERSION

TECHNICAL FIELD

The present invention relates to an aqueous pigment liquid dispersion using C. I. pigment green 36, and to an ink-jet recording ink using the aqueous pigment liquid dispersion.

BACKGROUND ART

Ink-jet recording aqueous inks have become the major ink for ink-jet recording use other than an industrial use because the danger of fire and toxicity such as mutagenicity, which are peculiar to oil-based inks, can be reduced.

In such aqueous inks, dyes have been used as coloring agents because stability is high, nozzle clogging is reduced, color-developing property is favorable, and printing with high image quality is possible. However, dyes have the problems of poor water resistance and light fastness.

In order to solve these problems, the conversion of coloring agents from dyes to pigments has been actively carried out. Pigment inks are expected to have excellent water resistance and light fastness, but the problem of nozzle clogging occurs due to the aggregation/precipitation of pigments. For this reason, various methods have been investigated, which use polymer-based dispersants to disperse microparticulated pigments in an aqueous medium.

In order to carry out multicolor printing using these pigments as coloring agents, all of the 4 colored inks, i.e. black, cyan, magenta, and yellow, have to fulfill, in addition to color-developing property, good dispersion stability, discharging property, and preservation stability.

Therefore, the selection of a pigment that is appropriate for each color, the combination of a pigment and a polymer dispersant which can favorably and stably disperse each pigment, and a production method of an aqueous pigment liquid dispersion using the aforementioned combination have been considered in detail. However, there are numerous types of pigments corresponding to each color, and the details of a dispersion method to be used vary according to respective pigments. Therefore, the optimal ink-jet recording inks for all colors are not necessarily obtained so far.

In recent years, the attempts have been carried out, in which color reproduction of a printed image is improved by using inks having color tones such as red, green, and violet, in addition to the 4 colored inks of black, cyan, magenta, and yellow. Moreover, the ink-jet recording pigment inks have been desired, in which a lot of colors fulfill, in addition to good color-developing property, good dispersion stability, discharging property, luster of an image, and preservation stability.

When the 3 colors of red, green, and violet are combined with the aforementioned basic 4 colors, it is found that an image having extremely enlarged color zone and good color reproduction can be formed by using pigments having preferable color-developing zone (see Patent Reference 1).

However, it was difficult to select pigments having both ideal color-developing zone and the aforementioned ink-jet adequacy, and to use the pigments so as to provide ink-jet recording inks simultaneously having dispersibility, discharging property, and preservation stability.

Regarding green color for example, the investigation has been carried out on the special ink-jet recording ink for formation of a color filter pattern as an ink-jet recording ink that uses a green pigment. However, almost all of conventional inks for formation of a color filter pattern are organic solvent-based inks. In the case where the formation of a color filter pattern is carried out using ink-jet recording inks, a special ink-jet printer in an air-conditioned factory is operated according to operating time of production facilities. However, in order to be widely used for a consumer ink-jet printer, the ink-jet recording inks need to directly respond to printing request as needed and to provide a stable printed image even after long-term preservation in an ink container. The temperature range of an environment in which the ink-jet recording ink is used by a consumer is wide. Therefore, in order that these ideal operations are performed by an inexpensive consumer ink-jet printer, the ink-jet recording inks have to keep very good dispersibility and stable discharging property.

In recent years, the demand for long-term stability of color-development of a printed image has increased. Moreover, as the case where printed matter is industrially used outside has increased, good light fastness of ink-jet recording pigment inks has simultaneously been demanded. In addition, when inks are expected to be used as an ink for thermal jet recording, preservation stability at high temperature is essential. As described above, the demands for the properties of inks have been strict.

In order to fulfill the aforementioned demands, extensive studies are needed on the selection of a green pigment, the selection of a polymer dispersant to be combined therewith, the optimal composition when the dispersant is used, and the production method that uses the composition.

In addition, the number of types of green pigment is very small in comparison with basic 4 colors. Therefore, by using a small number of green pigments, all of the necessary properties of consumer ink-jet recording inks should be realized such as light fastness, color-developing property, and dispersion stability. However, the study for improving the basic properties of the ink-jet recording ink that uses a green pigment is not sufficient, and currently, the same levels of dispersibility and preservation stability as those of inks that use basic 4 colors are not realized in the ink-jet recording ink that uses a green pigment.

In addition to pigment green 7, C. I. pigment green 36 is often used as a green pigment for various uses. Of these, C. I. pigment green 36 has so good color-developing property and light fastness that it can be used as a color filter. However, C. I. pigment green 36 contains a lot of bromine atoms and has a high specific gravity. Therefore, C. I. pigment green 36 is likely to precipitate in a liquid, and it is very difficult to maintain dispersion with a low viscosity that is typical in an ink-jet recording ink. Moreover, the aggregation of the pigment particles is likely to occur. For good dispersion, it is essential to perform the adsorption of polymer dispersants to the pigment surface and to perform the stabilization of dispersion due to steric hindrance.

For example, there is the report on the method of coating C. I. pigment green 36 with the copolymers that contain, as essential components, styrene monomers of 65 to 85 mol % at a monomer ratio, acrylate monomers of 5 to 15 mol %, and methacrylate monomers of 10 to 20 mol %, to thereby produce an ink-jet recording ink having good light fastness and dispersibility (see Patent Reference 2). However, in the ink-jet recording ink produced by the aforementioned method, the molecular weight of the used resins is high, and the resins are used at the almost same quantity as that of the pigments in order to stably disperse C. I. pigment green 36. Because the quantity of the used resins is not reduced sufficiently, the discharging property in a high-temperature environment and the stable discharge after long-term preservation are not sufficient although the initial dispersibility is good.

Moreover, there is the disclosure of the ink composition in which C. I. pigment green 36 is used as a green pigment within a 6 colored ink set and the styrene-acrylic acid type copolymers with a molecular weight of 10,000 are used as a dispersant resin (see Patent Reference 1). However, the pigment is not strongly coated with the resins because the ink composition is produced only by the dispersion using a dispersing machine with a media. The quantity of the resins used for the stabilization of the pigment dispersion is large, and the large quantity of resins that are not directly related to the coating of the pigment is present in an aqueous medium. Therefore, the discharging property in a high-temperature environment and the long-term preservation stability during preservation are not particularly sufficient.

Moreover, there is the disclosure of the ink-jet ink in which C. I. pigment green 36 is used as a pigment, the copolymers with a weight average molecular weight of 11,000 and an acid value of 325, which are made of styrene/methacrylic acid/butyl acrylate, are used as a dispersant, and the ratio of the dispersant to the resin is reduced to 1:4.5 (see Patent Reference 3). However, the aqueous solution, in which the copolymers are dissolved with potassium, is prepared in the production of the ink, and C. I. pigment green 36 is dispersed in the aqueous solution. Therefore, the resins are not sufficiently attached to the pigment surface, and the existence of the resins dissolved in the ink medium may deteriorate the preservation stability during high-temperature preservation.

In addition, there is the report on the aqueous pigment dispersion in which water-soluble phthalocyanine derivatives adsorb to the surface of the pigment particles of C. I. pigment green 36, to thereby improve the dispersibility of the pigment and reduce the quantity of the added acrylic water-soluble resin solution such that the mass ratio of the acrylic water-soluble solution to the pigment is reduced to about $1/10$ (see Patent Reference 4). However, the water-soluble phthalocyanine derivatives are very likely to elute into the dispersion, and cause the deterioration of the long-term preservation stability of the aqueous pigment dispersion together with the resin component originally dissolved in the dispersion.

As described above, the several known documents disclose the aqueous pigment liquid dispersion and the ink-jet recording ink that use C. I. pigment green 36 as a green ink that should be added in the ink set of the basic 4 colors because the pigment green 36 has good color-developing property and light fastness. However, C. I. pigment green 36 has a high specific gravity and is likely to precipitate. Therefore, in order that the pigment green 36 is stably dispersed to obtain the same properties as those of the basic 4 colors, it is necessary to prepare the aqueous pigment liquid dispersion and the ink-jet recording ink by using different composition and production steps from those of the basic 4 colors.

In order to particularly improve the discharging stability and preservation stability in a high-temperature environment, it is important to strongly coat the surface of C. I. pigment green 36 with the required minimum resins, to thereby reduce the quantity of the resins dissolved or dispersed in an aqueous medium. Regarding the ink-jet recording ink disclosed in the aforementioned Patent References, the various types of dispersant and additives are used to aim at the improvement of dispersion stability, but these Patent References are not necessarily focused on the case where C. I. pigment green 36 is used. As a result, the ink-jet recording ink of green color has never had dispersion stability and preservation stability that are as sufficient as those of inks of the other basic colors. In particular, the aqueous pigment liquid dispersion and the ink-jet recording ink, which have practically sufficient dispersion stability and preservation stability during high-temperature preservation, have never been obtained.

[Patent Reference 1]
Japanese Unexamined Patent Application, First Publication No. 2001-354886
[Patent Reference 2]
Japanese Unexamined Patent Application, First Publication No. 2000-186244
[Patent Reference 3]
Japanese Unexamined Patent Application, First Publication No. 2002-088290
[Patent Reference 4]
Japanese Unexamined Patent Application, First Publication No. 2000-303014

DISCLOSURE OF INVENTION

Problems to be Solved by the Invention

An object of the present invention is to provide an aqueous pigment liquid dispersion which achieves excellent dispersion stability and long-term preservation stability, and high luster of a printed image; and enables the color zone to be enlarged and the color reproduction to be improved in an ink-jet recording method when it is used for the production of an ink-jet recording ink having a green color.

Moreover, another object of the present invention is to provide an ink-jet recording ink having a green color, in which dispersion stability, discharging property, and long-term preservation stability are good, the printed image formed by the ink has good light fastness and luster, and a multicolor image having good color reproduction can be formed by using the ink in combination with other ink-jet recording inks having different colors.

In addition, another object of the present invention is to provide a production method of the aqueous pigment liquid dispersion for ink-jet recording.

Means to Solve the Problems

The present inventors have intensively performed their investigation in order to solve the aforementioned objects, and then found that the aforementioned objects can be solved by using, as main components, a green pigment having specified structure and a styrene-acrylic acid type copolymer within the specified ranges, and completed the present invention.

In other words, the present invention provides an aqueous pigment liquid dispersion, comprising: C. I. pigment green 36 (a); a styrene-acrylic acid type copolymer (b); a basic compound (c); and a wetting agent (d), wherein the styrene-acrylic acid type copolymer (b) has an acid value of 120 to 240, a weight average molecular weight of 6,000 to 40,000, and styrene-based monomer units of 60 mass % or more in the total of all the monomer units, and the mass ratio (b)/(a) of the styrene acrylic acid type copolymer (b) to the C. I. pigment green 36 (a) is within a range from 0.15 to 0.25.

An aqueous pigment liquid dispersion of the present invention includes the pigment green 36 having good light fastness and the styrene-acrylic acid type copolymer having the specified composition and properties. Therefore, the dispersibility is good, and the initial dispersion particle diameter is extremely small. Also, the styrene-acrylic acid type copolymers, which are blended within the specified mass ratio to the pigment green 36, coat the pigment surface, and the quantity of the resins that are detached from the pigment is extremely small. Therefore, the dispersion stability is good, and nozzle clogging does not occur, the viscosity is low, and the discharging property is good. In addition, the preservation stability during high-temperature preservation is good.

Moreover, the present invention provides an ink-jet recording ink comprising, as a main component, the aforementioned aqueous pigment liquid dispersion.

An ink-jet recording ink of the present invention is excellent in dispersion stability, discharging property, and long-term preservation stability, and is used in combination with other ink-jet recording inks having different colors so as to constitute an ink set which can form a multicolor image having good color reproduction.

In addition, the present invention provides a production method of an aqueous pigment liquid dispersion, comprising: a kneading step of kneading a mixture including C. I. pigment green 36 (a), a styrene-acrylic acid type copolymer (b), a basic compound (c), and a wetting agent (d), thereby producing a colored kneaded mixture; and a dispersion step of dispersing the colored kneaded mixture in an aqueous medium by using a dispersing machine with media, wherein the styrene-acrylic acid type copolymer (b) has an acid value of 120 to 240, a weight average molecular weight of 6,000 to 40,000, and styrene-based monomer units of 60 mass % or more in the total of all the monomer units, and the mass ratio (b)/(a) of the styrene acrylic acid type copolymer (b) to the C. I. pigment green 36 (a) is within a range from 0.15 to 0.25 in the kneading step.

According to an aqueous pigment liquid dispersion of the present invention, the pigment surface of C. I. pigment green 36 (a) can be coated well with the resins of the required minimum quantity to coat it. Also, the quantity of the dispersed resins that are detached from the pigment can be reduced largely. Therefore, the good dispersibility and long-term preservation stability of the aqueous pigment liquid dispersion can be achieved.

Effect of the Invention

An aqueous pigment liquid dispersion of the present invention include, within the specified ratios, the combination of C. I. pigment green 36 (a) and the styrene-acrylic acid type copolymer (b) having the above specified monomer composition, acid value, and molecular weight. Therefore, the dispersibility and long-term preservation stability are good. Moreover, an ink-jet recording ink, which includes the aqueous pigment liquid dispersion as a main component, has good discharging property, dispersibility, and long-term preservation stability. In addition, the printed image formed by using the ink has good luster and light fastness. Furthermore, a multicolor image having good color reproduction can be formed by using the ink in combination with other ink-jet recording inks having different colors.

In addition, the ink can be preferably used for an ink-jet recording device using a thermal jet system.

Also, by using a production method of an aqueous pigment liquid dispersion according to the present invention, it is possible to produce the aforementioned aqueous pigment liquid dispersion and ink-jet recording ink that have the good properties.

BEST MODE FOR CARRYING OUT THE INVENTION

The pigment used in the present invention is C. I. pigment green 36 (a) (hereinafter, may be abbreviated to "pigment green 36".). In the structure thereof, all the hydrogen atoms of benzene rings of copper phthalocyanine were substituted by bromine atoms, and some of the bromine atoms (30 mol % or less) may be substituted by chlorine atoms.

Regarding the particle diameter of C. I. pigment green 36 (A), the volume average particle diameter thereof obtained by observation with an electron microscope is preferably 150 or less. The particle diameter that exceeds 150 nm may adversely affect the filtration property of a pigment liquid dispersion and the discharging property and luster of an ink obtained by the pigment liquid dispersion. The pigment green 36 that is a pigment with high specific gravity is likely to precipitate in liquid and difficult to be dispersed stably. For good dispersion, it is important to perform the stable adsorption of the resins to the pigment surface and to perform the stabilization of dispersion due to steric hindrance.

In this case, when the resin quantity required to coat the pigment surface is defined by R/P, the minimum quantity of the resins tends to be much smaller than that for a conventional pigment because the pigment green 36 (a) has high specific gravity. In addition, the surface of pigment green 36 (a) tends to be difficult to be adsorbed by excess resins, and the excess resins are released in an aqueous pigment liquid dispersion so as to cause the deteriorations of dispersion stability, discharging property, and long-term preservation stability. Therefore, the maximum quantity of the usable resins is also much smaller than that for a conventional pigment. For the pigment green 36 (a) that is difficult to be stably dispersed, the excess quantity of resins is conventionally added in order to improve dispersion property. That is the reason why the detached resins are increased in an aqueous medium and the preservation stability deteriorates. The aqueous pigment liquid dispersion of the pigment green 36 (a) tends to be affected by the excess detached resins in an aqueous medium. Therefore, the surface of the pigment green 36 (a) have to be coated with the required minimum quantity of resins. As a result, the optimal range of the mass ratio (b)/(a) of the styrene acrylic acid type copolymer (b) to the pigment green 36 (a), which imparts the best properties to the aqueous pigment liquid dispersion and the ink-jet recording ink that use the pigment green 36 (a), is much narrower than that of a conventional pigment.

Moreover, the iron content is preferably 40 ppm or less in the pigment green 36 (a) used in the present invention. Iron is contained in the pigment green 36 (a) as an impurity, and the quantity thereof can be determined by ICP emission spectral analysis. The iron content that exceeds 40 ppm deteriorates the preservation stabilities of produced aqueous pigment liquid dispersion and ink-jet recording ink containing the aqueous pigment liquid dispersion as a main component. The iron content is preferably 35 ppm or less, and more preferably 30 ppm or less.

The pigment green 36 (a) contains magnesium and silicon as impurities, and the reduction of the contents thereof is preferred. The magnesium content is preferably 70 ppm or less, and more preferably 50 ppm or less. The silicon content is preferably 50 ppm or less, and more preferably 45 ppm or less.

Although the reason why the existence of these impurities affects the preservation stability of the ink-jet recording ink is not clear, the following reason can be considered. Metal impurities generate metal ions in the ink, which cause the generation of precipitates and the deterioration of the recovery property of clogging in the aqueous pigment liquid dispersion and the ink-jet recording ink that contain the pigment green 36 (a) whose dispersion property is likely to deteriorate intrinsically.

The acid washing is preferably performed in order to reduce iron, magnesium, and silicon contained in the pigment green 36 (a). In particular, the washing with a hydrochloric acid aqueous solution is preferred. This acid washing can be performed by adding an acid solution to the pigment particles of the pigment green 36 (a) or the aqueous suspension of the pigment particles. When the press-cake is prepared in the production step of the pigment green 36 (a), the acid washing may be performed by directly adding an acid solution therein.

The styrene-acrylic acid copolymer (b) used in the present invention includes, as structural monomers, at least a styrene-based monomer unit and a monomer unit that contains an unsaturated aliphatic carboxylic acid having a radical polymerizable double bond. Of the various possibilities, copolymers containing a styrene monomer and at least one of acrylic acid and methacrylic acid are preferred, and copolymers containing a styrene, acrylic acid and methacrylic acid are particularly desirable. Regarding the composition of the monomers constituting the copolymer, the proportion of the styrene-based monomer component in the total of all the monomer components is 60 mass % or more, and preferably 90 mass % or less. In particular, the combined total of the styrene-based monomer component, the acrylic acid monomer component, and the methacrylic acid monomer component is preferably at least 95 mass % within the total of all the monomer components. Because the styrene-acrylic acid copolymer of the present invention contains a high concentration of the styrene-based monomer unit equivalent to at least 60 mass % of the total of all the monomer units, the copolymer adsorbs favorably to the hydrophobic pigment surfaces, and is able to favorably maintain the dispersibility of these pigments. The aforementioned adsorption is strong, and the resins very strongly adsorb particularly to the pigment green 36 (a) so as to coat it. In comparison with the case where the resins are used for other pigments, extremely stable dispersibility is maintained after the long-term storage at high temperature.

In contrast, if the proportion of the styrene-based monomer component is less than 60 mass %, then the affinity of the styrene-acrylic acid copolymer (b) to C. I. pigment green 36 (a) tends to be inadequate, and the dispersion stability tends to deteriorate. Also, in the obtained ink-jet recording ink, the recording property to a plain paper tends to deteriorate, the image-recording density tends to be lowered, and the water resistance property is also prone to deteriorate. Moreover, if the proportion of the styrene-based monomer component exceeds 90 mass %, then the solubility of the styrene-acrylic acid copolymer (b) in aqueous media deteriorates, the dispersibility of the pigment within the aqueous pigment dispersion solution and the resulting dispersion stability tend to deteriorate, and when the pigment dispersion solution is used in an ink-jet recording ink, the printing stability is also prone to deteriorate.

The acid value of the styrene-acrylic acid type copolymer (b) used in an aqueous pigment liquid dispersion of the present invention is within a range from 120 to 240 mgKOH/g. When the acid value is less than 120 mgKOH/g, hydrophilicity becomes low, and the dispersion stability of the pigments tends to deteriorate. Meanwhile, when the acid value is more than 240 mgKOH/g, the aggregation of the pigments is prone to occur, and the water resistance of an ink-printed matter tends to deteriorate. The acid value is more preferably within a range from 160 to 200 mgKOH/g, and particularly preferably within a range from 175 to 190 mgKOH/g.

The styrene-acrylic acid type copolymer (b) is preferably used in combination with acrylic acid and methacrylic acid as component monomers because the regularity of the backbone structure is broken to cause the effect of improving the solubility of the resins.

As a styrene-based monomer unit which constitutes the styrene-acrylic acid type copolymer used in the present invention, a known compound can be used. Examples thereof include an alkylstyrene such as styrene, α-methylstyrene, β-methylstyrene, 2,4-dimethylstyrene, α-ethylstyrene, α-butylstyrene, or α-hexylstyrene; a halogenated styrene such as 4-chlorostyrene, 3-chlorostyrene, or 3-bromostyrene; 3-nitrostyrene; 4-methoxystyrene; and vinyltoluene.

Among these styrene-based monomers, an alkylstyrene monomer is preferably used, and a styrene monomer is most preferably used.

The styrene-acrylic acid type copolymer (b) may contain a monomer other than a styrene-based monomer, an acrylic acid, and a methacrylic acid, which is polymerizable with these monomers. The content of this monomer is preferably lower than 5 mass % as a component quantity. Examples thereof include (meth)acrylic esters such as methyl (meth)acrylate, ethyl (meth)acrylate, n-propyl (meth)acrylate, isopropyl (meth)acrylate, n-butyl(meth)acrylate, sec-butyl (meth)acrylate, tert-butyl (meth)acrylate, 2-methyl butyl (meth)acrylate, 2-ethylbutyl (meth)acrylate, 3-methylbutyl (meth)acrylate, 1,3-dimethylbutyl (meth)acrylate, pentyl (meth)acrylate, hexyl (meth)acrylate, 2-ethylhexyl (meth)acrylate, heptyl (meth)acrylate, octyl (meth)acrylate, or nonyl (meth)acrylate; (meth)acrylic ester derivatives such as 2-ethoxyethyl acrylate, 3-ethoxypropyl acrylate, 2-ethoxybutyl acrylate, 3-ethoxybutyl acrylate, dimethylaminoethyl (meth)acrylate, hydroxyethyl (meth)acrylate, hydroxypropyl (meth)acrylate, hydroxybutyl (meth)acrylate, ethyl-α-(hydroxymethyl) acrylate, or methyl-α-(hydroxymethyl) acrylate; aryl (meth)acrylic esters and aralkyl (meth)acrylic esters such as phenyl (meth)acrylate, benzyl (meth)acrylate, or phenylethyl (meth)acrylate; polyhydric alcohol such as diethylene glycol, triethylene glycol, polyethylene glycol, glycerin, or bisphenol A; and mono(meth)acrylic esters of polyhydric phenol; and dialkyl maleic ester such as dimethyl maleate or diethyl maleate. One, or two or more of these monomers can be added as monomer components.

The styrene-acrylic acid type copolymer (b) used in the present invention has the weight average molecular weight within a range from 6,000 to 40,000. The weight average molecular weight is preferably within a range from 7,500 to 30,000, and more preferably within a range from 10,000 to 14,000. When the weight average molecular weight is lower than 6,000, the long-term storage stability of the liquid dispersion tends to deteriorate although it is easy to perform the dispersion and microparticulation of the pigment green 36 (a) in the beginning. Also, the precipitation tends to occur due to the aggregation of the pigments, and there is a problem in that sufficient luster of a printed matter tends not to be achieved.

When the weight average molecular weight of the styrene-acrylic acid type copolymer (b) exceeds 40,000, the viscosity of the ink-jet recording ink, which is prepared from the aqueous pigment liquid dispersion using the styrene-acrylic acid type copolymer (b), tends to increase. Therefore, the discharging stability of the ink tends to deteriorate, or the gel-like resin microparticles, which inhibit the filtration of the dispersion, are likely to occur.

The styrene-acrylic acid type copolymer (b) used in the present invention may be any of a random copolymer, a block copolymer, and a graft copolymer. An example of a graft copolymer is a graft copolymer in which polystyrene or the copolymer of styrene and a nonionic monomer, which is copolymerizable with styrene, forms a stem or a branch and a copolymer of acrylic acid or methacrylic acid, and another monomer including styrene forms a stem or a branch. The styrene-acrylic acid type copolymer (b) may be the mixture of the aforementioned graft copolymer and a random copolymer.

In an aqueous pigment liquid dispersion of the present invention, the mass ratio (b)/(a) between the styrene-acrylic acid type copolymer (b) and the pigment green 36 (a) is within a range from 0.15 to 0.25. When the content of the styrene-acrylic acid type copolymer (b) is low and the mass ratio (b)/(a) is lower than 0.15, the coating of the pigment surface of the pigment green 36 (a) is insufficient, the pigment dispersion is insufficient, and the rub resistance and luster of a printed matter tend to deteriorate in the case where an ink-jet recording ink is prepared by using the aqueous pigment liquid dispersion. When the content of the styrene-acrylic acid type copolymer (b) is high and the mass ratio (b)/(a) exceeds 0.25, the solid detached resins are likely to precipitate into the aqueous pigment liquid dispersion, and the filtration property of the liquid dispersion and the discharging property of the ink tend to deteriorate. The optimal value of the mass ratio (b)/(a) varies depending on the combinations of the pigment to be used and the resin to be used. However, the pigment green 36 has a high specific gravity because of containing bromine atoms, and the surface area thereof is smaller than those of other pigments when compared at the same mass. Therefore, the optimal range of the mass ratio (b)/(a) is changed to small values in comparison with other pigments. In addition, although the reason is not clear, the upper limit of the optimal range is an extremely small value even in consideration of the specific gravity. As a result, the optimal range of the mass ratio (b)/(a) becomes extremely narrow. The pigment green 36 is totally different from other pigments in terms of these characteristics. Moreover, the effect of the mass ratio (b)/(a) on dispersion stability and preservation stability, particularly long-term preservation stability at a high temperature, tends to be significantly large in comparison with other pigments.

The styrene-acrylic acid type copolymer (b) is used in the coexistence with the basic compound (c) in order to neutralize the acrylic acid part thereof. The basic compound (c) softens the resins in the kneading step so as to facilitate the coating process of the pigment with the resins, and improves the dispersibility of the pigment coated with the resins in an aqueous medium. As the basic compound (c), any of an inorganic basic compound and an organic basic compound can be used. Examples of an organic basic compound include amines such as methylamine, dimethylamine, trimethylamine, ethylamine, diethylamine, and triethylamine; and triethanolamine, diethanolamine, and methyldiethanolamine. Examples of an inorganic basic compound include the hydroxides of alkali metals such as potassium and sodium; the carbonates of alkali metals such as potassium and sodium; the carbonates of alkali earth metals, etc. such as calcium and barium; and ammonium hydroxide. In particular, alkali metal hydroxides and alcoholamines are preferred in terms of dispersibility preservation stability, the decapping property of an ink-jet printer, and the water resistance of a printed matter when a kneaded pigment dispersion used in the present invention is applied to prepare an aqueous pigment liquid dispersion, and further an ink-jet recording ink. Among these basic compounds, alkali metal hydroxides as typified by potassium hydroxide, sodium hydroxide, and lithium hydroxide contribute the decrease in the viscosity of an aqueous pigment liquid dispersion, and are preferred in terms of the discharging stability of an ink-jet recording ink. In particular, potassium hydroxide is preferred. Moreover, the alkali metal hydroxide is preferably used in an aqueous solution, and the addition quantity thereof is preferably adjusted so that the neutralization percentage is within a range from 80% to 130% on the basis of the acid value of the styrene-acrylic acid type copolymer (b).

The neutralization percentage is preferably set to be 80% or higher in terms of the improvement of the dispersion rate in an aqueous medium when an aqueous pigment liquid dispersion is produced using a kneaded pigment dispersion, and the dispersion stability and the preservation stability of an aqueous pigment liquid dispersion. Also, the neutralization percentage is preferably set to be 130% or lower in terms of the reduction of the quantity of the resins which is detached from the pigment surface, and exists in the ink while being dispersed or solved therein; and the prevention of gelation during long-term preservation; and the water resistance of a printed matter produced by using the ink.

In the present invention, the neutralization percentage means the value which indicates the percentage (how many times) of a basic compound added in comparison with the quantity required to neutralize all the carboxyl groups in the styrene-acrylic acid type copolymer (b). For example, the neutralization percentage is calculated by the following equation in the case where potassium hydroxide is used as a basic compound.

Neutralization Percentage(%)=((Mass of Basic Compound(g)×56×1,000)/(Acid Value of Resin×Equivalent Quantity of Basic Compound×Quantity of Resin(g)))×100

As the wetting agent (d) used in the present invention, known conventional wetting agents can be used, and examples thereof include polyols such as glycerin, ethylene glycol, diethylene glycol, triethylene glycol, tetraethylene glycol, polyethylene glycol, propylene glycol, dipropylene glycol, polypropylene glycol, 1,3-propanediol, 1,4-butanediol, 1,5-pentanediol, 1,6-hexanediol, 1,2,6-hexanetriol, trimethylolpropane, or pentaerythritol; lactams such as 2-pyrrolidone, N-methyl-2-pyrrolidone, ϵ-caprolactan; and 1,3-dimethylimidazolidine.

An example of a production method of an aqueous pigment liquid dispersion of the present invention is a method including a kneading step of kneading a mixture including C. I. pigment green 36 (a), a styrene-acrylic acid type copolymer (b), a basic compound (c), and a wetting agent (d), thereby producing a colored kneaded mixture; and a dispersion step of dispersing the solid colored kneaded mixture in an aqueous medium. In this method, the styrene-acrylic acid type copolymer (b) has styrene-based monomer units of 60 mass % or more in the total of all the monomer units and monomer units containing an unsaturated aliphatic carboxylic acid containing a radical polymerizable double bond. In addition, the styrene-acrylic acid type copolymer (b) has an acid value of 120 to 240 and a weight average molecular weight of 6,000 to 40,000. In the aforementioned steps, the mass ratio (b)/(a) of the styrene acrylic acid type copolymer (b) to the pigment green 36 (a) is set within a range from 0.15 to 0.25.

The styrene-acrylic acid type copolymer (b) makes it possible to produce an aqueous pigment liquid dispersion with good dispersibility to an extent without using the kneading step in the aforementioned production method. Also, it is possible to obtain an ink-jet recording ink having high luster after printing.

However, in order to coat the pigment surface strongly and efficiently with the resins of the smaller quantity so as to improve dispersibility and to produce an ink-jet recording ink having extremely excellent long-term preservation stability at high temperature, it is preferable to use the production method including the kneading step of kneading a mixture including a styrene-acrylic acid type copolymer (b), the pigment green 36 (a), and a basic compound (c), thereby producing a solid colored kneaded mixture; and the dispersion step of dispersing the colored kneaded mixture in an aqueous medium. When an aqueous pigment liquid dispersion is produced using the aforementioned production method, the preservation stability of the ink-jet recording ink that includes the aqueous pigment liquid dispersion as a main component is further improved at high temperature. Also, when the mass ratio (b)/(a) of the styrene-acrylic acid type copolymer (b) to the pigment green 36 (a) is set within a range from 0.15 to 0.25 in the kneading step, the grinding of the pigments during the kneading and the coating of the pigment surface with the resins proceed very well, and the quantity of the styrene-acrylic acid type copolymers (b), which are detached from the pigment, and are dispersed or dissolved, decreases. Therefore, the problems of discharging property due to the nozzle clogging, which is caused by the deposition of the copolymers onto the inner wall of the nozzle, are preferably prevented and difficult to occur.

An aqueous pigment liquid dispersion of the present invention preferably includes triethanolamine. In the production method of the aqueous pigment liquid dispersion, triethanolamine is preferably included in the mixture during the dispersion and agitating. In the production method of the aqueous pigment liquid dispersion that includes the kneading step, the kneading step is preferably performed such that triethanolamine is preferably included in the mixture during the kneading step, to thereby produce the colored kneaded mixture; and then the colored kneaded mixture is preferably dispersed in an aqueous medium, to thereby produce the aqueous pigment liquid dispersion.

Among the production method of the aqueous pigment liquid dispersion of the present invention, the respective steps of the particularly preferable production method that includes the kneading step are described hereinafter.

(a) Kneading Step

In the kneading step used in producing an aqueous pigment liquid dispersion of the present invention, the mixture is kneaded, which includes the pigment green 36 (a); a styrene-acrylic acid type copolymer (b) that has styrene-based monomer units of 60 mass % or more, an acid value of 120 to 240 mgKOH/g, and a weight average molecular weight of 6,000 to 40,000; the basic compound (c); and the wetting agent (d).

In the kneading step, the carboxyl groups within the styrene-acrylic acid type copolymer (b) are neutralized by the basic compound (c), causing an improvement in the dispersibility. Furthermore, the copolymer also undergoes swelling and surface softening under the influence of the wetting agent (d), leading to the formation of a single lump of a mixture containing the copolymer and the pigment green 36 (a). This mixture is a solid at normal temperatures, but has an extremely high viscosity at the kneading temperature of 50° C. to 100° C., and therefore a large shearing force can be applied to the mixture during kneading, enabling the pigment green 36 (a) to be ground into fine particles, and enabling the newly formed pigment surfaces generated as a result of the grinding to be strongly coated with the styrene-acrylic acid type copolymer (b), thereby enabling the production of a stable fine dispersion within water.

In the kneading step, the addition of the basic compound (c) and the wetting agent (d) causes the styrene-acrylic acid type copolymer (b) to adopt a swollen state. As a result, the copolymer can be softened at a temperature that is far below the glass transition point. Moreover, as a result, there is no need to add a high-solubility solvent capable of dissolving the copolymer, and because this removes the necessity for a step to subsequently remove the solvent following kneading, the productivity improves.

In the kneading step used in producing an aqueous pigment liquid dispersion of the present invention, roll mills such as two-roll mills or three-roll mills can be used. However, with kneading using such roll mills, the quantity of resin used tends to be large because the kneaded mixture must be combined as a single lump from the initial stages of kneading. In order to enable the solid content ratio during kneading to be maintained within a specified range, and enable a stable shearing force to be applied to the colored kneaded mixture from the start to the end of the kneading step, closed systems or kneading devices that can be used as closed systems are preferred, as they enable suppression of volatilization of the wetting agent and the like. The use of a kneading device that includes an agitating tank, an agitating tank lid, and a uniaxial or multiaxial agitating blade is preferred. There are no particular restrictions on the number of agitating blades, although in order to achieve a more favorable kneading action, the use of two or more agitating blades is preferred.

If a kneading device with this type of construction is used, then following production of the colored kneaded mixture for an aqueous pigment dispersion solution via the kneading step, the kneaded mixture need not be removed from the kneading device, but rather the kneaded mixture can be directly diluted in the same agitating tank, and can be agitated to initiate the initial dispersion or to continue the dispersion for the production of the aqueous pigment liquid dispersion.

Examples of this type of device include a Henschel mixer, pressurized kneader, Banbury mixer or planetary mixer, and of these, a planetary mixer is particularly desirable. A planetary mixer refers to a planetary-type kneading device, and is the generic term used for kneading apparatus equipped with an agitating blade that sweeps out a planetary motion (hereafter, the name planetary mixer is used). In the production process of the present invention, kneading is performed on a colored kneading mixture that contains a pigment and a resin and has a high solid fraction concentration, and the viscosity varies over a wide range as the kneading progresses, depending on the state of the kneaded mixture. Planetary mixers are particularly suited to coping with a wide range of viscosities from low viscosity to high viscosity, and all of the operations from the commencement of kneading to the dispersion step including the diluting following the kneading can be performed consecutively within the same apparatus. Moreover, addition of the wetting agent is comparatively simple, distillation under reduced pressure is possible, and regulation of the viscosity and the shearing force during the kneading step is relatively simple.

By consecutively performing the kneading step to the diluting as described above, anionic hydrophilic groups within the styrene-acrylic acid type copolymers (b) that coat the pigment surface in the capsular state can be gradually aligned toward the surrounding aqueous medium while keeping the capsular state. In addition, it is possible to realize the coating state of the pigment green 36 (a) which has good stability and wetting property to an aqueous medium.

In the kneading step, water may be appropriately added in addition to the wetting agent (d) according to need while the kneading is performed. In the production method of the present invention, the aqueous solution of the basic compound (c) is preferably used. Also, the basic compound (c) is preferably used at the quantity that corresponds to 0.8 to 1.2 times the quantity required to neutralize all the carboxyl groups in the styrene-acrylic acid type copolymer (b).

In an aqueous pigment liquid dispersion of the present invention, the mass ratio (b)/(a) of the styrene-acrylic acid type copolymer (b) to the pigment green 36 (a) is preferably within a range from 0.15 to 0.25. The addition of the total quantity of the styrene-acrylic acid type copolymer (b), which is required to coat the surface of the pigment green 36 (a) in the kneading step, enables the adsorption of the styrene-acrylic acid type copolymer to the pigment surface to proceed strongly and uniformly. Also, the adjustment of the mass ratio (b)/(a) to 0.15 or more enables the entire surface of pigment green 36 to be coated. Meanwhile, the adjustment of the mass ratio (b)/(a) to 0.25 or less can reduce the styrene-acrylic acid type copolymer component that is detached and present in the aqueous pigment liquid dispersion and ink-jet recording ink and causes the deterioration of discharging property and preservation stability.

Regarding the quantity of the wetting agent (d) in the kneading step, the mass ratio (d)/(a) is preferably set within a range from 0.15 to 0.30. When the quantity of the wetting agent (d) exceeds the upper limit of the range and is added in the mixture, the sufficient shearing force cannot be applied to the mixture because of the reduction in the solid content. When the quantity of the wetting agent (d) is below the lower limit of the range and is added in the mixture, it becomes difficult that the solid components are fused with each others in the kneading step so as to form a single lump of mixture that is appropriate for kneading. After all, there is the tendency that the sufficient shearing force becomes difficult to be applied. As a result, there is the tendency that the pigment green 36 is difficult to be ground sufficiently, the pigment surfaces are difficult to be adsorbed by the styrene-acrylic acid type copolymers, and the uniform solid colored kneaded mixture for an ink-jet recording ink cannot be obtained.

In the solid colored kneaded mixture prepared in the kneading step, water, or water and the wetting agent are preferably added to prepare the liquid mixture with an appropriate viscosity for the following dispersion step. In the preparation of the liquid mixture, in order not to generate the aggregated particles, it is preferable to gradually reduce the viscosity by performing the agitation while adding water, or water and the wetting agent in the solid colored kneaded mixture. At this time, a kneading device that includes an agitating tank and an agitating blade is preferably used because the solid colored kneaded mixture in the agitating tank after the completion of the kneading step can be directly liquefied and diluted.

By using the aforementioned kneading step, the styrene-acrylic acid type copolymers can be strongly attached to the surface of C. I. pigment green 36, and the pigment surface can be coated efficiently. Meanwhile, in the method that does not include the aforementioned kneading step and prepares the aqueous pigment liquid dispersion only by a dispersion device using a media, the resins are not attached to the pigment surface strongly and efficiently, and consequently, a large quantity of the resins are used to prepare the liquid dispersion.

(b) Dispersion Step

The colored kneaded mixture for an aqueous pigment dispersion solution, which was subjected to the kneading step, is a solid kneaded mixture at room temperature. In the dispersion step, the colored kneaded mixture for ink-jet ink is diluted within an aqueous medium, and then subjected to the dispersion treatment, to thereby produce an aqueous pigment liquid dispersion for ink-jet ink. By subjecting the diluted pigments, which were finely ground and coated with styrene-acrylic acid copolymer (b) in the kneading step so as to form soft aggregates present in an aqueous medium, to the dispersion treatment, the aggregations are released, and the particle diameter of the dispersed particles becomes smaller. Therefore, the ink-jet properties such as the discharge stability, the dispersibility and the print density can be improved when an ink-jet recording ink is prepared. In the production method of the present invention, the pigment green 36 (a), which is present within the colored kneaded mixture for ink-jet ink to be used in the dispersion step, has already been ground finely during the kneading step and then coated with the styrene-acrylic acid copolymer (b) that functions as the dispersant, and consequently exhibits favorable dispersibility within water. As a result, the pigment green (a) can be readily dispersed within an aqueous medium in a short period of time, which improves the production efficiency. Accordingly, an unnecessarily longer period of the dispersion step is actually undesirable. For example, in the case of a nano mill, which represents one type of beads mill, a dispersion time of 30 seconds to 3 minutes is sufficient. If the dispersion time is shorter than this dispersion time range, then removal of aggregated particles tends to be incomplete, increasing the likelihood of aggregation and precipitation of the pigment. In contrast, if the dispersion step is performed for a time that exceeds the above dispersion time range, then the styrene-acrylic acid copolymer (b) adsorbed to the pigment surface during the kneading step is more likely to detach, meaning the coating of the pigment surface becomes incomplete, which tends to cause a deterioration in the stability after being adjusted to ink formation.

In the aqueous pigment liquid dispersion for ink-jet recording obtained following completion of the dispersion step, the quantity of the pigment green 36 (a) is preferably within a range from 5 to 25 mass %, and is even more preferably from 10 to 20 mass %. If the quantity of the pigment green 36 (a) is less than 5 mass %, then the coloring of the ink-jet recording ink produced from the aqueous pigment liquid dispersion for an ink-jet ink tends to be inadequate, and a satisfactory image density may be unattainable. In contrast, if the quantity exceeds 25 mass %, then the dispersion stability of the pigment within the aqueous pigment liquid dispersion for an ink-jet ink tends to deteriorate. Furthermore, the pigment green 36 (a) coated with the styrene-acrylic acid copolymer (b) preferably has an average particle diameter of not more than 100 nm.

In the present invention, the aqueous medium refers to water, or a liquid medium that contains water and the wetting agent as the main components. The wetting agent used in the dispersion step can be the same compound as that used during kneading.

Conventional devices can be employed as the dispersing machine to be used during the dispersion step. Devices such as a planetary mixer used in the aforementioned kneading can also be employed. In those cases where a more powerful dispersing action is required, machines that use media, such as a paint shaker, ball mill, nano mill, attritor, basket mill, sand mill, sand grinder, dyno mill, dispermat, SC mill, spike mill or agitator mill may be used. Furthermore, examples of dispersing machines that do not use media include an ultrasonic homogenizer, a high-pressure homogenizer, nanomizer, a dissolver, disper, or high-speed blade dispersing machine. Any one of the above dispersing machines may be used alone, or a combination of two or more different machines may be used. Of the above, dispersing machines that use media exhibit a powerful dispersing action, and are consequently preferred. Following dispersion, if required, the concentration of the dispersion may be adjusted by adding more of the aqueous medium.

Depending on a type of dispersing machine, before performing the dispersion (main dispersion) with a dispersing machine, an aqueous medium is preferably added in the colored kneaded mixture after the kneading step as needed, followed by mixing and diluting, to thereby preliminarily adjust an appropriate viscosity for the process of the dispersing machine (hereinafter, the mixture subjected to the viscosity adjustment may be referred to as a viscosity-adjusted mixture.).

For example, when a sand mill is used, the following processes are preferred: the mixture is diluted to have a solid content within a range from 10 to 40 mass %, the viscosity is preferably adjusted to be within a range from several tens to several hundreds mPa·sec, and then, the mixture is transferred into a sand mill and subjected to the dispersion.

An aqueous medium for the dilution of the colored kneaded mixture may contain a wetting agent in terms of the needs of the drying prevention of an aqueous pigment liquid dispersion for an ink-jet recording ink and the viscosity adjustment during the dispersion process. Regarding the quantity thereof, the total quantity of the wetting agent for the dilution and the wetting agent within the colored kneaded mixture is preferably within a range from 3 to 50 mass %, and more preferably from 5 to 40 mass % in an aqueous pigment liquid dispersion for an ink-jet recording ink. When the total quantity is below 3 mass %, the drying prevention effect tends to be insufficient. When the total quantity exceeds 50 mass %, the dispersion stability of the liquid dispersion tends to deteriorate. The wetting agent to be used in the production of the colored kneaded mixture for an ink-jet ink and the wetting agent within an aqueous medium to be used for the dilution thereof may be the same or different.

(c) Centrifugal Separation Step

It is important that the dispersion obtained via the process described above is subjected to centrifugal separation, thereby removing those coarse particles that exist within the aqueous pigment dispersion solution.

By performing a centrifugal separation following completion of the dispersion step and preparation of the aqueous dispersion, those coarse particles that exhibit unsatisfactory dispersibility can be removed. The centrifugal separation can be performed under conditions of at least 10,000 G for at least 3 minutes, and is preferably performed at 15,000 to 21,000 G for a period of 5 to 15 minutes. By performing this coarse particle removal step, precipitation within the aqueous pigment dispersion solution that has undergone the removal step can be suppressed significantly.

An ink-jet recording ink of the present invention can be prepared by normal methods using the aqueous pigment liquid dispersion described above.

When an ink-jet recording ink is prepared using the aqueous pigment liquid dispersion of the present invention, the treatments and additives listed within (i) to (iv) below can be used in accordance with the ink formulation and properties to be improved.

(i) The wetting agent (d) described above may be added to prevent drying of the ink. For the purpose of preventing drying, the wetting agent (d) content within the ink is preferably within a range from 3 to 50 mass %.

(ii) A penetrant may be added to improve the penetration of the ink into the recording medium and regulate the dot diameter on the recording medium.

Examples of the penetrant include lower alcohols such as ethanol and isopropyl alcohol, ethylene oxide additives of alkyl alcohols such as ethylene glycol hexyl ether and diethylene glycol butyl ether, and propylene oxide additives of alkyl alcohols such as propylene glycol propyl ether.

The penetrant content within the ink is preferably within a range from 0.01 to 10 mass %.

(iii) In order to adjust the ink properties such as surface tension, a surfactant may also be added. There are no particular restrictions on the possible surfactants to be used for the above purpose, and examples thereof include all manner of anionic surfactants, nonionic surfactants, cationic surfactants and amphoteric surfactants. Of these, anionic surfactants and nonionic surfactants are preferred.

Examples of anionic surfactants include alkylbenzenesulfonates, alkylphenylsulfonates, alkylnaphthalenesulfonates, salts of higher fatty acids, sulfates of higher fatty acid esters, sulfonates of higher fatty acid esters, sulfates and sulfonates of higher alcohol ethers, higher alkylsulfosuccinates, polyoxyethylene alkyl ether carboxylates, polyoxyethylene alkyl ether sulfates, alkyl phosphates and polyoxyethylene alkyl ether phosphates. Specific examples of these anionic surfactants include dodecylbenzenesulfonates, isopropylnaphthalenesulfonates, monobutylphenylphenol monosulfonates, monobutylbiphenylsulfonates and dibutylphenylphenol disulfonates.

Examples of nonionic surfactants include polyoxyethylene alkyl ethers, polyoxyethylene alkylphenyl ethers, polyoxyethylene fatty acid esters, sorbitan fatty acid esters, polyoxyethylene sorbitan fatty acid esters, polyoxyethylene sorbitol fatty acid esters, glycerol fatty acid esters, polyoxyethylene glycerol fatty acid esters, polyglycerol fatty acid esters, sucrose fatty acid esters, polyoxyethylene alkylamines, polyoxyethylene fatty acid amides, fatty acid alkylolamides, alkyl alkanolamides, acetylene glycol, oxyethylene adducts of acetylene glycol and polyethylene glycol polypropylene glycol block copolymers. Of these, polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, oxyethylene adducts of acetylene glycol and polyethylene glycol polypropylene glycol block copolymers are preferred.

Examples of other surfactants that may be used include silicone-based surfactants such as polysiloxane oxyethylene adducts; fluorine-based surfactants such as perfluoroalkyl carboxylates, perfluoroalkyl sulfonates and oxyethylene perfluoroalkyl ethers; and biosurfactants such as spicrispolic acid, rhamnolipid and lysolecithin.

These surfactants may be used either alone, or in mixtures containing two or more different surfactants.

Furthermore, considering the solution stability of the surfactant, the surfactant HLB (Hydrophile-Lipophile Balance) value is preferably within a range from 7 to 20.

In those cases where a surfactant is added, the quantity added is preferably within a range from 0.001 to 1 mass %, even more preferably from 0.001 to 0.5 mass %, and is most preferably from 0.01 to 0.2 mass % relative to the entire mass of the ink. If the quantity of the surfactant is less than 0.001 mass %, then the effects of the surfactant tend to be difficult to obtain, whereas if the quantity exceeds 1 mass %, then problems such as image bleeding are more likely.

(iv) If required, preservatives, viscosity regulators, pH regulators, chelating agents, plasticizers, antioxidants and ultraviolet absorbers and the like may also be added.

EXAMPLES

Hereinafter, the present invention is further described in detail with reference to Examples.

In the following Synthesis Examples, Examples, and Comparative Examples, "part" and "%" represent "part by mass" and "mass %", respectively.

Synthesis Example 1

In the reactor including an agitating device, a dropping device, and a reflux device, 100 parts of methyl ethyl ketone was added, and nitrogen substitution was performed in the reactor while agitating. While keeping nitrogen atmosphere in the reactor, heating was performed to reflux methyl ethyl ketone, and then, the mixed solution of 74 parts of styrene, 11 parts of acrylic acid, 15 parts of methacrylic acid, and 8 parts of the polymerization catalyst (manufactured by Wako Pure Chemical Industries, Ltd./"V-59") was added dropwise from the dropping device for 2 hours. From the middle of dropping, temperature of the reaction system was kept at 80° C.

After the completion of dropping, the reaction was kept at the same temperature for 25 hours. In the middle of the reaction, while checking the consumption of the raw materials, the polymerization catalyst was added appropriately. After the completion of the reaction, the mixture was cooled and added with methyl ethyl ketone, so as to obtain the solution of the anionic group-containing styrene-acrylic acid type copolymer (A-1) with a solid content of 50%. This styrene-acrylic acid type copolymer (A-1) has an acid value of 185 mgKOH/g and a weight average molecular weight of 10,200.

In the present invention, a weight average molecular weight is a value which is measured by a GPC (Gel Permeation Chromatography) method and is converted to the molecular weight of polystyrene used as a standard material. Herein, the measurement was performed by using the following apparatuses and conditions.

Solution-sending pump: LC-9A
System controller: SLC-6B
Auto injector: S1L-6B
Detector: RID-6A
These are manufactured by Shimazu Corporation.
Data processing software: Sic480II data station (manufactured by System Instruments Corporation).
Column: GL-R400 (a guard column)+GL-R440+GL-R450+GL-R400M (manufactured by Hitachi Chemical Co., Ltd.)
Elution solvent: THF
Elution flow rate: 2 ml/min
Column temperature: 35° C.

In accordance with the production method of Synthesis Example 1, the following styrene-acrylic acid copolymers were synthesized by adjusting the types and quantities of the monomers and the reaction conditions.

Synthesis Example 2

The styrene-acrylic acid type copolymer (A-2) was synthesized, which has the composition ratio of the monomer units of styrene/acrylic acid/methacrylic acid=77/10/13 (mass ratio), a weight average molecular weight of 12,000, and an acid value of 152 mgKOH/g.

Synthesis Example 3

The styrene-acrylic acid type copolymer (A-3) was synthesized, which has the composition ratio of the monomer units of styrene/acrylic acid/methacrylic acid 77/10/13 (mass ratio), a weight average molecular weight of 7,600, and an acid value of 152 mgKOH/g.

Synthesis Example 4

The styrene-acrylic acid type copolymer (A-4) was synthesized, which has the composition ratio of the monomer units of styrene/acrylic acid/methacrylic acid=77/10/13 (mass ratio), a weight average molecular weight of 20,000, and an acid value of 152 mgKOH/g.

Synthesis Example 5

The styrene-acrylic acid type copolymer (A-5) was synthesized, which has the composition ratio of the monomer units of styrene/methyl methacrylate/acrylic acid/methacrylic acid=50/27/10/13 (mass ratio), a weight average molecular weight of 12,000, and an acid value of 151 mgKOH/g.

Synthesis Example 6

The styrene-acrylic acid type copolymer (A-6) was synthesized, which has the composition ratio of the monomer units of styrene/acrylic acid/methacrylic acid=77/10/13 (mass ratio), a weight average molecular weight of 4,900, and an acid value of 152 mgKOH/g.

Synthesis Example 7

The styrene-acrylic acid type copolymer (A-7) was synthesized, which has the composition ratio of the monomer units of styrene/acrylic acid/methacrylic acid=77/10/13 (mass ratio), a weight average molecular weight of 45,000, and an acid value of 152 mgKOH/g.

Example 1

| | |
|---|---|
| Styrene-acrylic acid type copolymer (A-1) (obtained in Synthesis Example 1) | 140 parts |
| Pigment green 36 (manufactured by DIC Corporation; quantities of impurities: 130 ppm of Mg, 80 ppm of Si, and 100 ppm of Fe) | 700 parts |
| 8 N Potassium hydroxide aqueous solution | 76 parts |
| Diethylene glycol | 155 parts |

The mixture of the aforementioned components was prepared and added in the planetary mixer with a capacity of 50 L (manufactured by Inoue Manufacturing Co., Ltd./PLM-V-50V) which was kept at 60° C. Then, the kneading began at a rotational frequency of 59 rpm and an orbital frequency of 22 rpm. After a lapse of 5 minutes, the mixture was aggregated, and the kneading was continued for 240 minutes. During the kneading, the consumed current value for 240 minutes was 2 to 8 ampere, and the increase and decrease were repeated depending on the rotational period of the agitating blade.

After a lapse of 240 minutes, 1,000 parts of water were added as a let-down operation, to thereby obtain the uniform mixture with a pigment content of 35.2 mass %.

The obtained mixture was transferred into a stainless drum. Then, 1211 parts of ion-exchanged water and 368 parts of diethylene glycol were added thereto, and the mixture was uniformly mixed using the agitating motor. This mixture was dispersed using the beads mill (manufactured by Asada Iron Works. Co. Ltd./Nano Mill NM-G-2L) at a temperature of 21° C. with a residence time of 50 seconds, to thereby obtain the dispersion.

Subsequently, this dispersion was subjected to the continuous centrifugal separation using the continuous centrifugal separation apparatus (manufactured by Kokusan Enshinki Co. Ltd./H-600S, a capacity of 2 L) at a temperature of 27° C. with a centrifugal force of 18,900 G and a residence time of 12 minutes. Then, the aqueous pigment dispersion with the pigment content of 15.0% was obtained.

Example 2

| | |
|---|---|
| Styrene-acrylic acid type copolymer (A-2) (obtained in Synthesis Example 2) | 136 parts |
| Pigment green 36 (manufactured by DIC Corporation; quantities of impurities: 130 ppm of Mg, 80 ppm of Si, and 100 ppm of Fe) | 680 parts |
| 8 N Potassium hydroxide aqueous solution | 61 parts |
| Diethylene glycol | 158 parts |

The mixture of the aforementioned components was prepared and added in the planetary mixer with a capacity of 50 L (manufactured by Inoue Manufacturing Co., Ltd./PLM-V-50V) which was kept at 60° C. Then, the kneading began at a rotational frequency of 59 rpm and an orbital frequency of 22 rpm. After a lapse of 8 minutes, the mixture was aggregated, and the kneading was continued for 240 minutes. During the kneading, the consumed current value for 240 minutes was 2 to 6 ampere, and the increase and decrease were repeated depending on the rotational period of the agitating blade. This was due to the following reason. The mixture was a semisolid with an extremely high viscosity so that it was not distributed uniformly. Therefore, whenever the agitating blade sheared the mixture periodically, a strong force was applied thereto.

After a lapse of 240 minutes, 1,000 parts of water were added as a let down operation, to thereby obtain the uniform mixture with a pigment content of 33.6 mass %.

The obtained mixture was transferred into a stainless drum. Then, 1008 parts of ion-exchanged water and 323 parts of diethylene glycol were added thereto, and the mixture was uniformly mixed using the agitating motor. This mixture was dispersed using the beads mill (manufactured by Asada Iron Works. Co. Ltd./Nano Mill NM-G-2L) at a temperature of 15° C. with a residence time of 2.5 minutes, to thereby obtain the dispersion.

Subsequently, this dispersion was subjected to the continuous centrifugal separation using the continuous centrifugal separation apparatus (manufactured by Kokusan Enshinki Co. Ltd./H-600S, a capacity of 2 L) at a temperature of 19° C. with a centrifugal force of 18,900 G and a residence time of 12 minutes. Then, the aqueous pigment dispersion with the pigment content of 15.0% was obtained.

Example 3

| | |
|---|---|
| Styrene-acrylic acid type copolymer (A-2) (obtained in Synthesis Example 2) | 168 parts |
| Pigment green 36 (manufactured by DIC Corporation; quantities of impurities: 130 ppm of Mg, 80 ppm of Si, and 100 ppm of Fe) | 680 parts |
| 8 N Potassium hydroxide aqueous solution | 76 parts |
| Diethylene glycol | 143 parts |

The mixture of the aforementioned components was prepared, and the subsequent operations were performed in the same manner as Example 2, to thereby obtain the aqueous pigment dispersion with the pigment content of 15.1%.

Example 4

The same operations as in Example 2 were performed other than the replacement of 136 parts of the styrene-acrylic acid type copolymer (A-2) with 136 parts of the styrene-acrylic acid type copolymer (A-3) obtained in Synthesis Example 3, to thereby obtain the aqueous pigment dispersion with the pigment content of 15.0%.

Example 5

The same operations as in Example 2 were performed other than the replacement of 136 parts of the styrene-acrylic acid type copolymer (A-2) with 136 parts of the styrene-acrylic acid type copolymer (A-4) obtained in Synthesis Example 4, to thereby obtain the aqueous pigment dispersion with the pigment content of 15.1%.

Comparative Example 1

The same operations as in Example 2 were performed other than the replacement of 136 parts of the styrene-acrylic acid type copolymer (A-2) with 136 parts of the styrene-acrylic acid type copolymer (A-5) obtained in Synthesis Example 5, to thereby obtain the aqueous pigment dispersion with the pigment content of 15.3%.

Comparative Example 2

| | |
|---|---|
| Styrene-acrylic acid type copolymer (A-2) (obtained in Synthesis Example 2) | 204 parts |
| Pigment green 36 (manufactured by DIC Corporation; quantities of impurities: 130 ppm of Mg, 80 ppm of Si, and 100 ppm of Fe) | 680 parts |
| 8 N Potassium hydroxide aqueous solution | 92 parts |
| Diethylene glycol | 118 parts |

The mixture of the aforementioned components was prepared, and the subsequent operations were performed in the same manner as Example 2, to thereby obtain the aqueous pigment dispersion with the pigment content of 14.9%.

Comparative Example 3

| | |
|---|---|
| Styrene-acrylic acid type copolymer (A-2) (obtained in Synthesis Example 2) | 68 parts |
| Pigment green 36 (manufactured by DIC Corporation; quantities of impurities: 130 ppm of Mg, 80 ppm of Si, and 100 ppm of Fe) | 680 parts |
| 8 N Potassium hydroxide aqueous solution | 31 parts |
| Diethylene glycol | 188 parts |

The mixture of the aforementioned components was prepared, and the subsequent operations were performed in the same manner as Example 2, to thereby obtain the aqueous pigment dispersion with the pigment content of 14.9%.

Comparative Example 4

The same operations as in Example 2 were performed other than the replacement of 136 parts of the styrene-acrylic acid type copolymer (A-2) with 136 parts of the styrene-acrylic acid type copolymer (A-6) obtained in Synthesis Example 6, to thereby obtain the aqueous pigment dispersion with the pigment content of 14.7%.

Comparative Example 5

The same operations as in Example 2 were performed other than the replacement of 136 parts of the styrene-acrylic acid type copolymer (A-2) with 136 parts of the styrene-acrylic acid type copolymer (A-7) obtained in Synthesis Example 7, to thereby obtain the aqueous pigment dispersion with the pigment content of 14.8%.

Comparative Example 6

The same operations as in Example 2 were performed other than the replacement of 680 parts of the pigment green 36 (manufactured by DIC Corporation) with 660 parts of the pigment green 7 (manufactured by DIC Corporation), to thereby obtain the aqueous pigment dispersion with the pigment content of 14.8%.

Comparative Example 7

The same operations as in Example 2 were performed other than the replacement of 680 parts of the pigment green 36 (manufactured by DIC Corporation) with 660 parts of the pigment blue 76 (manufactured by DIC Corporation), to thereby obtain the aqueous pigment dispersion with the pigment content of 14.8%.

The compositions of the aforementioned Examples and Comparative Examples are shown in Table 1.

Evaluation of Particle Diameter

Evaluation of Dispersion Property

The aqueous pigment liquid dispersions obtained in the respective Examples and Comparative Examples were diluted by 1,000 times with ion-exchanged water, and the volume average particle diameters thereof were measured at room temperature (25° C.) using "Microtrac UPA 150" (manufactured by Leeds & Northrup Co.). The obtained volume average particle diameters were regarded as the particle diameters of the respective aqueous pigment liquid dispersions. Also, the viscosities of the liquid dispersions were measured at 25° C. using E type viscometer (TVE-20L manufactured by TOKIMEC INC).

Quantitative Determination of Coarse Particles

The aqueous pigment liquid dispersions obtained in the respective Examples and Comparative Examples were diluted by 1100 times with ion-exchanged water, and passed through a particle size analyzer AccuSizer 780 APS manufactured by Particle Sizing Systems Corporation. Then, the concentration of coarse particles with a particle diameter of 0.5 μm or more was calculated. Herein, the concentration is based on the aqueous pigment liquid dispersion before the dilution.

Filtration Property

The aqueous liquid dispersion obtained in respective Examples and Comparative Examples continuously passed

TABLE 1

| | Composition of Aqueous Pigment Liquid Dispersion | | | | | |
|---|---|---|---|---|---|---|
| | Resin Composition St/MMA/AA/MA | Acid Value (mgKOH/g) | Resin/ Pigment Mass Ratio | Weight Average Molecular Weight | Pigment | Production Method |
| Example 1 | 74/0/11/15 | 185 | 0.20 | 10200 | Pigment Green 36 | Kneading |
| Example 2 | 77/0/10/13 | 152 | 0.20 | 11900 | Pigment Green 36 | Kneading |
| Example 3 | 77/0/10/13 | 152 | 0.25 | 11900 | Pigment Green 36 | Kneading |
| Example 4 | 77/0/10/13 | 152 | 0.20 | 7600 | Pigment Green 36 | Kneading |
| Example 5 | 77/0/10/13 | 152 | 0.20 | 20000 | Pigment Green 36 | Kneading |
| Comparative Example 1 | 50/27/10/13 | 151 | 0.20 | 12000 | Pigment Green 36 | Kneading |
| Comparative Example 2 | 77/0/10/13 | 152 | 0.30 | 11900 | Pigment Green 36 | Kneading |
| Comparative Example 3 | 77/0/10/13 | 152 | 0.10 | 11900 | Pigment Green 36 | Kneading |
| Comparative Example 4 | 77/0/10/13 | 152 | 0.20 | 4900 | Pigment Green 36 | Kneading |
| Comparative Example 5 | 77/0/10/13 | 152 | 0.20 | 45000 | Pigment Green 36 | Kneading |
| Comparative Example 6 | 77/0/10/13 | 152 | 0.20 | 11900 | Pigment Green 7 | Kneading |
| Comparative Example 7 | 77/0/10/13 | 152 | 0.20 | 11900 | Pigment Blue 76 | Kneading |

The aqueous pigment liquid dispersions obtained in the aforementioned Examples and Comparative Examples were evaluated using the following evaluation items. The obtained results are shown in Table 2.

through a filter cartridge (manufactured by Pall Corporation, NXA), which was made of polypropylene and had a diameter of 0.5 μm, at room temperature and a rate of 500 g per minute. The total quantity of the used aqueous liquid dispersion was 12 kg. In accordance with the degree of the reduction in the flow rate due to the filtration, the following evaluations were given.

Good: the case where the reduction in the flow rate was 20% or less and the filtration was performed smoothly No bad: the case where the reduction in the flow rate exceeded 20% and was 40% or less No good: the case where the reduction in the flow rate exceeded 40%

Preservation Stability of Ink-jet Recording Ink

The ink-jet recording inks were prepared using the aqueous pigment liquid dispersions obtained in respective Examples and Comparative Examples, according to the following composition.

| | |
|---|---|
| Aqueous pigment liquid dispersion | 2.67 parts |
| 2-Pyrrolidinone | 1.60 parts |
| Triethylene glycol monobutyl ether | 1.60 parts |
| Surfynol 440 | 0.10 parts |
| (manufactured by Nissin Chemical Industry Co., Ltd.) | |
| Glycerine | 0.60 parts |
| Ion-exchanged water | 13.44 parts |

The inks prepared as described above were diluted by 200 times with ion-exchanged water, and the volume average particle diameters thereof were measured at room temperature (25° C.) using "Microtrac UPA 150" (manufactured by Leeds & Northrup Co.). The obtained volume average particle diameters were regarded as the initial particle diameters.

Subsequently, each of the inks was added in a glass vial, and preserved in a thermostat at 60° C. for 35 days. Then, the same particle diameter measurement as described above was performed to obtain the particle diameter after heating, and the particle diameter change rate was defined as follows.

Particle diameter change rate(%)=(particle diameter after heating−initial particle diameter)/initial particle diameter×100

In the test, the existence or nonexistence of the aggregate was confirmed by visual check, which may occur in the ink preserved for 35 days.

Discharging Property of Ink-jet Recording Ink

The aforementioned ink was loaded into the position of the black cartridge in the ink-jet printer EM-930C (manufactured by Seiko Epson Corporation), and the adequacy for the ink-jet recording, i.e. the ink-discharging property, was evaluated by performing the continuous printing with image density of 100% on 80% of the area of A0 size paper. The evaluation of the discharging property was as follows.

Good: The discharging failure was not observed during the continuous printing.

No good: The abnormality of the ink-discharging direction or the irregularity of the printing density was confirmed during the continuous printing.

Luster

The aforementioned ink was loaded into the position of the black cartridge in the ink-jet printer EM-930C (manufactured by Seiko Epson Corporation), and the recordings with an image density of 40% to 100% (in increments of 5%) were performed using the Premium Glossy Photo Paper (manufactured by Seiko Epson Corporation) as a recording medium. Then, the luster of the obtained image was measured using "micro-TRI-gloss" (manufactured by BYK-Gardner) as a Gloss value at an angle of 20°. The maximum value within the image recording range was regarded as the luster.

TABLE 2

| | Dispersibility of Aqueous Pigment Liquid Dispersions | | | | Preservation Stability of Ink-jet Recording Inks | | Discharging Property/ Image Quality | |
|---|---|---|---|---|---|---|---|---|
| | Particle Diameter (nm) | Viscosity of Liquid Dispersion (mPa·s) | Concentration of Coarse Particle ($10^7$/mL) | Filtration Property | Particle Diameter Change Rate after Heating (%) | Existence of Aggregates after Heating | Discharging Property | Luster |
| Example 1 | 77 | 3.4 | 1 | Good | 0 | No | Good | 102 |
| Example 2 | 80 | 3.3 | 5 | Good | 1 | No | Good | 125 |
| Example 3 | 84 | 3.2 | 18 | No Bad | 2 | No | Good | 118 |
| Example 4 | 82 | 3.0 | 7 | Good | 1 | No | Good | 107 |
| Example 5 | 82 | 3.7 | 9 | Good | 1 | No | Good | 103 |
| Comparative Example 1 | 156 | 4.2 | 5 | Good | 5 | No | Good | 75 |
| Comparative Example 2 | 96 | 4.0 | 6 | No Good | 4 | No | Good | 110 |
| Comparative Example 3 | 110 | 2.9 | 39 | Good | 13 | No | Good | 65 |
| Comparative Example 4 | 102 | 2.8 | 2 | Good | 2 | No | Good | 68 |
| Comparative Example 5 | 95 | 5.8 | 4 | Good | 12 | No | No Good | 36 |
| Comparative Example 6 | 352 | 7.5 | 569 | Good | 52 | Yes | No Good | 22 |
| Comparative Example 7 | 552 | 4.6 | 355 | No Good | 165 | Yes | No Good | 21 |

As is obvious from Tables 1 and 2, in the aqueous pigment liquid dispersions of Examples 1 to 5, both of the initial dispersion particle diameter and the concentration of coarse particles showed small values, and the filtration property was also good. Moreover, the ink-jet recording inks prepared using these aqueous pigment liquid dispersions showed the small particle diameter change rate after heating and good high-temperature preservation stability, and it was found that these ink-jet recording inks were appropriate for an ink-jet recording device using a thermal jet system. The ink-discharging property was good, and the luster of the formed image was high.

Meanwhile, in the aqueous pigment liquid dispersion of Comparative Example 1 in which the quantity of the styrene-based monomer component within the styrene-acrylic acid type copolymer was small, the initial dispersion particle diameter could not be sufficiently small, and the luster of the formed image was reduced. In the aqueous pigment liquid dispersion of Comparative Example 4 in which the weight average molecular weight of the styrene-acrylic acid type copolymer was low, the initial dispersion particle diameter could not be sufficiently small, and the luster was reduced.

In the aqueous pigment liquid dispersion of Comparative Example 5 in which the weight average molecular weight was high, the discharging property of the ink-jet recording ink prepared using it was not good, and the luster was significantly reduced. In addition, the preservation stability was reduced, and therefore, the particle diameter change ratio after heating increased.

In the aqueous pigment liquid dispersion of Comparative Example 2 in which the ratio of the styrene-acrylic acid type copolymer/the pigment green 36 exceeded the upper limit of the defined range, the filtration property was not good, and there was a risk of nozzle clogging when the ink-jet recording ink was prepared. Meanwhile, in the aqueous pigment liquid dispersion of Comparative Example 3 in which the ratio was below the lower limit of the defined range, the kneading step did not proceed well, and both of the initial dispersion particle diameter and the concentration of coarse particles became large. The particle diameter change rate after heating increased, and the preservation stability deteriorated.

In Comparative Examples 6 and 7 in which the aqueous pigment liquid dispersions were prepared using the pigment blue 76 and the pigment green 7 that is the same green pigment as the pigment green 36, the pigments could not be finely ground in the kneading step, and both of the initial dispersion particle diameter and the concentration of coarse particles became large. Also, the discharging property was not good. The preservation property was very poor in comparison with the pigment green 36

In addition, the aqueous pigment liquid dispersions and the ink-jet recording inks were prepared using the pigment green 36 in which the impurities within the pigment were reduced, and the improvement effects of the dispersibility, discharging property, and preservation stability were investigated. Related Examples are described hereinafter.

Preparation Example 1

In 1000 parts of the hydrochloric acid aqueous solution whose concentration was adjusted to 0.5 weight %, 100 parts of the press-cake containing the pigment green 36 with a pigment average primary particle diameter of 50 nm (which contains the pigment used in Example 1 at a solid content of 40 weight %, the solid containing 130 ppm of Mg, 80 ppm of Si, and 100 ppm of Fe) was dispersed, agitated at 70° C. for 1 hour, and then filtrated. Thereafter, 1000 parts of warm water was poured onto the filtrated cake, to thereby wash inorganic ions present on the pigment surface. Thereafter, the press-cake was taken out and dried in the dryer of 90° C. to 100° C. for 24 hours, to thereby obtain the pigment green 36 (B-1) in which magnesium, silicon, and iron were reduced to 43 ppm, 40 ppm, and 28 ppm, respectively.

Preparation Example 2

The same operations as in Preparation Example 1 were performed other than the replacement of the hydrochloric acid aqueous solution with the concentration of 0.5 weight % with the hydrochloric acid aqueous solution with the concentration of 2 weight %, to thereby obtain the pigment green 36 (B-2) in which magnesium, silicon, and iron were reduced to 44 ppm, 30 ppm, and 19 ppm, respectively.

Preparation Example 3

In 1000 parts of ion-exchanged water, 100 parts of the press-cake that is the same as that used in Preparation Example 1 was dispersed, agitated at 70° C. for 1 hour, and then filtrated. Thereafter, 1000 parts of warm water was poured onto the filtrated cake, to thereby try to wash inorganic ions present on the pigment surface. Thereafter, the press-cake was taken out and dried in the dryer of 90° C. to 100° C. for 24 hours, to thereby obtain the pigment green 36 (B-3) that contains a magnesium content of 120 ppm, a silicon content of 80 ppm, and an iron content of 100 ppm.

Example 6

The kneading using the planetary mixer, the dispersion using the beads mill, and the separation using the centrifugal separation apparatus were performed under the same condition as in Example 1 other than the replacement of 700 parts of the pigment green 36 used in Example 1 with 700 parts of the pigment green 36 (B-1) prepared in Preparation Example 1, to thereby obtain the aqueous pigment dispersion with the pigment content of 15.1%.

Example 7

The kneading using the planetary mixer, the dispersion using the beads mill, and the separation using the centrifugal separation apparatus were performed under the same condition as in Example 1 other than the replacement of 700 parts of the pigment green 36 used in Example 1 with 700 parts of the pigment green 36 (B-2) prepared in Preparation Example 2, to thereby obtain the aqueous pigment dispersion with the pigment content of 15.1%.

Example 8

The kneading using the planetary mixer, the dispersion using the beads mill, and the separation using the centrifugal separation apparatus were performed under the same condition as in Example 1 other than the replacement of 700 parts of the pigment green 36 used in Example 1 with 700 parts of the pigment green 36 (B-3) prepared in Preparation Example 3, to thereby obtain the aqueous pigment dispersion with the pigment content of 15.1%.

The compositions of the aforementioned Examples 6 to 8 are shown in Table 1 with the composition of Example 1 as Reference Example.

TABLE 3

| | Resin of Aqueous Pigment Liquid Dispersion | | | | Pigment of Aqueous Pigment Liquid Dispersion | | |
|---|---|---|---|---|---|---|---|
| | Resin Composition St/MMA/AA/MA | Acid Value (mgKOH/g) | Weight Average Molecular Weight | Washing of Pigment | Mg Content in Pigment (ppm) | Si Content in Pigment (ppm) | Fe Content in Pigment (ppm) |
| Example 6 | 74/0/11/15 | 185 | 10200 | Pigment Green 36 Washed with 0.5 N Hydrochloric Acid | 43 | 40 | 28 |
| Example 7 | 74/0/11/15 | 185 | 10200 | Pigment Green 36 Washed with 2 N Hydrochloric Acid | 44 | 30 | 19 |
| Example 8 | 74/0/11/15 | 185 | 10200 | Pigment Green 36 Washed with Water | 120 | 70 | 100 |
| Reference Example | 74/0/11/15 | 185 | 10200 | Unwashed Pigment Green 36 | 130 | 80 | 100 |

Moreover, the aqueous pigment liquid dispersions and ink-jet recording inks obtained in the aforementioned Examples 6 to 8 and Reference Example were evaluated using the following methods. The obtained results are shown in Table 4.

Evaluation of Particle Diameter

Evaluation of Dispersion Property

The volume average particle diameters and the viscosities of the aqueous pigment liquid dispersions were measured using the same methods as those performed in Examples 1 to 5 and Comparative Examples 1 to 7.

Preservation Stability of Ink-jet Recording Ink

The ink-jet recording inks were prepared using the aqueous pigment liquid dispersions obtained in Examples 6 to 8 and Reference Example, according to the following composition.

Herein, in the ink-jet recording inks used for the evaluation, the severer conditions were set to clarify the differences in the properties among Examples 6 to 8 and Reference Example. That is, the pigment concentration was set to about 4 mass % that was 2 times higher than those in the ink-jet recording inks used in Examples 1 to 5 and Comparative Examples 1 to 7, and the ink-jet recording inks were prepared using the respective aqueous pigment liquid dispersions in Examples 6 to 8 and Reference Example, according to the following composition that allows the aggregate of the pigments to easily occur.

| | |
|---|---|
| Aqueous pigment liquid dispersion | 5.34 parts |
| 2-Pyrrolidinone | 1.60 parts |
| Triethylene glycol monobutyl ether | 1.60 parts |
| Surfynol 440 (manufactured by Nissin Chemical Industry Co., Ltd.) | 0.10 parts |
| Glycerine | 0.60 parts |
| Ion-exchanged water | 10.77 parts |

The inks prepared as described above were diluted by 200 times with ion-exchanged water, and the volume average particle diameters thereof were measured at room temperature using "Microtrac UPA 150" (manufactured by Leeds & Northup Co.). The obtained volume average particle diameters were regarded as the initial particle diameters.

Subsequently, each of the inks was heated in a glass vial under the severer conditions of 80° C. and 49 days. Then, the same particle diameter measurement as described above was performed to obtain the particle diameter after heating, and the particle diameter change rate was calculated using the following equation.

Particle diameter change rate(%)=(particle diameter after heating−initial particle diameter)/initial particle diameter×100

In the test, the existence or nonexistence of the aggregate was confirmed by visual check, but the existence of the aggregate could not be confirmed in respective Examples and Comparative Examples.

Discharging Property of Ink-jet Recording Ink

The aforementioned ink was loaded into the position of the black cartridge in the ink-jet printer EM-930C (manufactured by Seiko Epson Corporation), and the adequacy for the ink-jet recording, i.e. the ink-discharging property during printing, was evaluated by performing the continuous printing with image density of 100% on 80% of the area of A0 size paper. The evaluation of the discharging property was as follows.

Good: The discharging failure was not observed during the continuous printing, and the good image was formed.

No good: The abnormality of the ink-discharging direction or the irregularity of the printing density was confirmed during the continuous printing.

Luster

The aforementioned ink was loaded into the position of the black cartridge in the ink-jet printer EM-930C (manufactured by Seiko Epson Corporation), and the recordings with an image density of 40% to 100% (in increments of 5%) were performed using the PICTORICO PHOTO GALLERY GLOSSY PAPER (manufactured by Olympus Corporation) as a recording medium. Then, the luster of the obtained image was measured using "micro-TRI-gloss" (manufactured by BYK-Gardner) as a Gloss value at an angle of 20°. The maximum value within the image recording range was regarded as the luster.

TABLE 4

| | Dispersibility of Aqueous Pigment Liquid Dispersions | | High-temperature Preservation Stability of Ink-jet Recording Ink | Discharging Property/ Image Quality | |
|---|---|---|---|---|---|
| | Particle Diameter (nm) | Viscosity of Liquid Dispersion (mPa·s) | Particle Diameter Change Rate after Heating (%) | Discharging Property | Luster (PICTORICO) |
| Example 6 | 75 | 2.9 | 7 | Good | 71 |
| Example 7 | 77 | 3.4 | 6 | Good | 72 |
| Example 8 | 87 | 3.2 | 33 | Good | 65 |
| Reference Example | 77 | 3.4 | 40 | Good | 64 |

As is obvious from Examples 6 to 8 and Reference Example, even in the ink-jet recording ink with the pigment green 36 concentration of about 4%, the high-temperature preservation stability was extremely high when the pigment green 36 had an iron content of 40 ppm or less. In particular, the ink-jet recording ink was appropriate for an ink-jet printer using a thermal jet system. In addition, it was found that the magnesium content and the silicon content were preferably 70 ppm or less and 50 ppm or less, respectively.

The invention claimed is:

1. An aqueous pigment liquid dispersion, comprising:
C. I. pigment green 36 (a); a styrene-acrylic acid based copolymer (b); a basic compound (c); and a wetting agent (d), wherein
the styrene-acrylic acid based copolymer (b) has an acid value of 120 to 240, a weight average molecular weight of 7,600-20,000, and styrene-based monomer units of 60 mass % or more in the total of all the monomer units constituting the styrene-acrylic acid based copolymer (b), and
the mass ratio (b)/(a), which is the mass of the styrene-acrylic acid based copolymer (b) divided by the mass of the C. I. pigment green 36 (a), is within a range of 0.20-0.25; and
an iron content within the C. I. pigment green 36 (a) is 30 ppm or less,
a magnesium content within the C. I. pigment green 36 (a) is 50 ppm or less, and
a silicon content is 45 ppm or less.

2. An aqueous pigment liquid dispersion according to claim 1, wherein the styrene-acrylic acid based copolymer (b) comprises the styrene-based monomer units, acrylic acid monomer units, and methacrylic acid monomer units, wherein the sum of the styrene-based monomer units, acrylic acid monomer units, and methacrylic acid units is 95 mass % or more in the total of all the monomer units constituting the styrene-acrylic acid based copolymer (b).

3. An aqueous pigment liquid dispersion according to claim 2, wherein the volume average particle diameter of the C. I. pigment green 36 (a) is 150 nm or less.

4. An ink-jet recording ink comprising, as a main component, the aqueous pigment liquid dispersion according to claim 2.

5. An ink-jet recording ink according to claim 4, wherein the ink-jet recording ink is used for an ink-jet recording device using a thermal jet system.

6. An aqueous pigment liquid dispersion according to claim 1, wherein the volume average particle diameter of the C. I. pigment green 36 (a) is 150 nm or less.

7. An ink-jet recording ink comprising, as a main component, the aqueous pigment liquid dispersion according to claim 1.

8. An ink-jet recording ink according to claim 7, wherein the ink-jet recording ink is used for an ink-jet recording device using a thermal jet system.

9. A production method of an aqueous pigment liquid dispersion, comprising:
a washing step of washing C. I. pigment green 36 (a) with a hydrochloric acid aqueous solution so as to reduce iron, magnesium, and silicon contained in the C. I. pigment green 36 (a),
a kneading step of kneading a mixture including the C. I. pigment green 36 (a), a styrene-acrylic acid based copolymer (b), a basic compound (c), and a wetting agent (d), thereby producing a colored kneaded mixture; and
a dispersion step of dispersing the colored kneaded mixture in an aqueous medium by using a dispersing machine with media, wherein
the styrene-acrylic acid based copolymer (b) has an acid value of 120 to 240, a weight average molecular weight of 7,600-20,000, and styrene-based monomer units of 60 mass % or more in the total of all the monomer units constituting the styrene-acrylic acid based copolymer (b),
the mass ratio (b)/(a), which is the mass of the styrene acrylic acid based copolymer (b) divided by the mass of the C. I. pigment green 36 (a), is within a range of 0.20-0.25 in the kneading step,
an iron content within the C. I. pigment green 36 (a) is 30 ppm or less,
a magnesium content within the C. I. pigment green 36 (a) is 50 ppm or less, and
a silicon content is 45 ppm or less.

10. A production method of an aqueous pigment liquid dispersion according to claim 9, wherein the mass ratio (d)/(a), which is the mass of the wetting agent (d) divided by the mass of the C. I. pigment green 36 (a), is within a range of 0.15-0.30 in the kneading step.

11. A production method of an aqueous pigment liquid dispersion according to claim 10, further comprising, following the dispersion step, a centrifugal separation step of performing centrifugal separation at 15,000 to 21,000 G.

12. A production method of an aqueous pigment liquid dispersion according to claim 9, further comprising, following the dispersion step, a centrifugal separation step of performing centrifugal separation at 15,000 to 21,000 G.

* * * * *